United States Patent
Sarangi et al.

(10) Patent No.: US 11,294,940 B2
(45) Date of Patent: Apr. 5, 2022

(54) METHODS AND SYSTEMS FOR AUTOMATED IDENTIFICATION OF AGRO-CLIMATIC ZONES

(71) Applicant: Tata Consultancy Services Limited, Mumbai (IN)

(72) Inventors: Sanat Sarangi, Thane (IN); Praneet Padinchare Vazhayil, Kochi (IN); Saranya Ramanath, Kochi (IN); Gopu Chandrasenan, Kochi (IN); Srinivasu Pappula, Hyderabad (IN)

(73) Assignee: Tata Consultancy Services Limited, Mumbai (IN)

( * ) Notice: Subject to any disclaimer, the term of this patent is extended or adjusted under 35 U.S.C. 154(b) by 95 days.

(21) Appl. No.: 16/063,539

(22) PCT Filed: Feb. 9, 2017

(86) PCT No.: PCT/IB2017/050702
§ 371 (c)(1),
(2) Date: Jun. 18, 2018

(87) PCT Pub. No.: WO2017/137914
PCT Pub. Date: Aug. 17, 2017

(65) Prior Publication Data
US 2018/0365267 A1    Dec. 20, 2018

(30) Foreign Application Priority Data
Feb. 12, 2016  (IN) .............................. 201621005038

(51) Int. Cl.
*G06F 16/29*     (2019.01)
*G06F 16/25*     (2019.01)
(Continued)

(52) U.S. Cl.
CPC .............. *G06F 16/29* (2019.01); *G06F 16/00* (2019.01); *G06F 16/2246* (2019.01);
(Continued)

(58) Field of Classification Search
CPC .... G06F 16/29; G06F 16/285; G06F 16/2246; G06F 16/258; G06F 16/00; G06F 16/2457
See application file for complete search history.

(56) References Cited

U.S. PATENT DOCUMENTS 6,529,890 B1 *  3/2003  Pandit ...................... G06N 5/00
                                                      706/47
6,976,027 B2 * 12/2005  Cutlip ...................... H04L 67/16
                                                      711/216
(Continued)

FOREIGN PATENT DOCUMENTS

WO    WO 2002/037332 A2    5/2002

OTHER PUBLICATIONS

Diego Calvanese, Knowledge Bases and Databases, Part 2: Ontology-Based Access to Information, 2009, downloaded from internet Aug. 2, 2021, downloaded from https://www.inf.unibz.it/~calvanese/teaching/08-09-kbdb/lecture-notes/p2-obda-2up.pdf (Year: 2009).*

(Continued)

*Primary Examiner* — Eman A Alkafawi
*Assistant Examiner* — Denise R Karavias
(74) *Attorney, Agent, or Firm* — Finnegan, Henderson, Farabow, Garrett & Dunner, LLP

(57) ABSTRACT

The present disclosure provides methods and systems for automated identification of agro-climatic zones. The methods deal with receiving parameters pertaining to ambience and soil from various external systems for a geographical region via one or more interaction methods. The parameters may be raw data or derived from raw data, homogenized and (Continued)

stored in a generic and hierarchical format for easy consumption. Inference is drawn from the parameters and associated attributes by comparing with historic attributes available in a knowledge base module for a corresponding agro-climatic zone. Inferences may also be made from parameters available in encoded form such as images, videos and ontological knowledge. Based on the comparison, a score is generated that reflects the degree of compliance with pre-defined agro-climatic zones.

8 Claims, 5 Drawing Sheets

(51) Int. Cl.
```
    G06F 16/28      (2019.01)
    G06Q 50/02      (2012.01)
    G06F 16/00      (2019.01)
    G06F 16/2457    (2019.01)
    G06N 5/04       (2006.01)
    G06F 16/22      (2019.01)
```
(52) U.S. Cl.
CPC ........ *G06F 16/2457* (2019.01); *G06F 16/258* (2019.01); *G06F 16/285* (2019.01); *G06N 5/04* (2013.01); *G06Q 50/02* (2013.01); *Y02A 90/10* (2018.01)

(56) References Cited

U.S. PATENT DOCUMENTS

| | | | |
|---|---|---|---|
| 7,277,797 B1 | 10/2007 | Kunitsyn et al. | |
| 8,396,870 B2* | 3/2013 | Birdwell | G06K 9/6224 707/737 |
| 9,734,220 B2* | 8/2017 | Karpistsenko | G06Q 50/28 |
| 10,303,677 B2* | 5/2019 | Farah | G06F 16/248 |
| 2011/0106317 A1 | 5/2011 | Maus et al. | |
| 2013/0185104 A1* | 7/2013 | Klavins | G06Q 30/018 705/7.12 |
| 2015/0278838 A1* | 10/2015 | Rasa | G06Q 30/0205 705/7.34 |
| 2015/0370935 A1* | 12/2015 | Starr | G06Q 50/02 703/11 |
| 2016/0232621 A1* | 8/2016 | Ethington | G06Q 50/02 |
| 2016/0379388 A1* | 12/2016 | Rasco | G06N 5/003 715/753 |

OTHER PUBLICATIONS

Sanjai J. Parikh et al. "Soil: The Foundation of Agriculture," 2012, Nature Education, downloaded from internet Jul. 27, 2021, downloaded from https://www.nature.com/scitable/knowledge/library/soil-the-foundation-of-agriculture-84224268/ (Year: 2012).*

Ji, Zhanlin et al., "A Cloud-Based Car Parking Middlware for IoT-Based Smart Cities: Design and Implementation," Sensors (Basel, Switzerland), Nov. 25, 2014, downloaded from IP.com (Year: 2014).*

Fielding, Dissertation, Chapter 5, Representational State Transfer (REST), University of CA, Irvine, 2000, downloaded from internet Jul. 28, 2021, downloaded from https://www.ics.uci.edu/~fielding/pubs/dissertation/rest_arch_style.htm (Year: 2000).*

* cited by examiner

US 11,294,940 B2

METHODS AND SYSTEMS FOR AUTOMATED IDENTIFICATION OF AGRO-CLIMATIC ZONES

CROSS-REFERENCE TO RELATED APPLICATIONS AND PRIORITY

The present application claims priority from Indian Patent Application No. 201621005038, filed on Feb. 12, 2016, the entirety of which is hereby incorporated by reference.

TECHNICAL FIELD

The embodiments herein generally relate to identifying agro-climatic zones and more particularly to methods and systems for automated identification of agro-climatic zones.

BACKGROUND

A geographical region is divided into a set of agro-climatic zones which indicate possible crops that can be grown in the zones. Based on various parameters pertaining to ambience such as temperature, rainfall, and the like and soil characteristics like type of soil, pH (potential of hydrogen) value, and the like, numerous agro-climatic zone classifications have been proposed for many geographical regions across the globe. As agro-climatic zone based classifications were done quite early in history based on broad trends and primitive measurement equipment, the validity of such classifications may be questionable in terms of precision. Also, with global warming and unforeseen change in climatic conditions, the classifications based on historical climatic conditions may prove to be erroneous. Hence, validating in real time whether a particular geographical region of interest should belong to an agro-climatic zone defined traditionally would help uncover anomalies or hotspots so that only suitable crops are grown in that geographical region of interest region. However, it is a challenge to not only automate this process end to end beginning with data acquisition from various non-homogenous sources but also to identify compliance of the agro-climatic zones for growing suitable crops in real time based on micro-climatic parameter values.

SUMMARY

Embodiments of the present disclosure present technological improvements as solutions to one or more of the above-mentioned technical problems recognized by the inventors in conventional systems.

In an aspect, there is provided a method comprising: receiving in real time, via an access interface module, through at least one interaction method, parameters pertaining to ambience and soil for a geographical region of interest associated with at least one agro-climatic zone pre-defined in a knowledge base module, the parameters being raw data or derived from the raw data; arranging, by an inferencing module, the received parameters and attributes associated thereof, for a plurality of time instances, in a hierarchical structure; comparing, by the inferencing module, the attributes with historic attributes available in the knowledge base module for a corresponding agro-climatic zone; and performing, by the inferencing module, in response to the comparison, one of identifying a classification of the geographical region of interest into one of the at least one agro-climatic zones or validating the classification of the geographical region of interest available in the knowledge base module.

In another aspect, there is provided a system comprising: one or more processors; and one or more internal data storage devices operatively coupled to the one or more processors for storing instructions configured for execution by the one or more processors, the instructions being comprised in: a knowledge base module comprising geographical regions mapped to agro-climatic zones, parameters and attributes associated thereof for the geographical regions; an access interface module configured to receive in real time, through at least one interaction technique, parameters pertaining to ambience and soil for a geographical region of interest associated with the at least one agro-climatic zone, the parameters being received as raw data or derived from the raw data; and an inferencing module configured to: arrange the received parameters and attributes associated thereof, for a plurality of time instances, in a hierarchical structure; compare the attributes with historic attributes available in the knowledge base module for a corresponding agro-climatic zone; and perform in response to the comparison, one of identifying a classification of the geographical region of interest into one of the at least one agro-climatic zones or validating the classification of the geographical region of interest available in the knowledge base module.

In another aspect, there is provided a system having a distributed architecture, communicating with at least some heterogeneous external systems sharing parameters pertaining to ambience and soil for a geographical region of interest, the system comprising: one or more data storage devices operatively coupled to one or more hardware processors and configured to store instructions configured for execution by the one or more hardware processors to: receive in real time, through at least one interaction technique, the parameters pertaining to the ambience and soil for the geographical region of interest associated with at least one agro-climatic zone pre-defined in a knowledge base module, the parameters being received as raw data or derived from the raw data; arrange the received parameters and attributes associated thereof, for a plurality of time instances, in a hierarchical structure; compare the attributes with historic attributes available in the knowledge base module for a corresponding agro-climatic zone; and perform in response to the comparison, one of identifying a classification of the geographical region of interest into one of the at least one agro-climatic zones or validating the classification of the geographical region of interest available in the knowledge base module.

In yet another aspect, there is provided a computer program product comprising a non-transitory computer readable medium having a computer readable program embodied therein, wherein the computer readable program, when executed on a computing device, causes the computing device to: receive in real time, through at least one interaction method, parameters pertaining to ambience and soil for a geographical region of interest associated with at least one agro-climatic zone pre-defined in a knowledge base module, the parameters being raw data or derived from the raw data; arrange, the received parameters and attributes associated thereof, for a plurality of time instances, in a hierarchical structure; compare, the attributes with historic attributes available in the knowledge base module for a corresponding agro-climatic zone; and perform, in response to the comparison, one of identifying a classification of the geographical region of interest into one of the at least one agro-climatic zones or validating the classification of the geographical region of interest available in the knowledge base module.

In an embodiment of the present disclosure, the instructions are further comprised in a data storage module configured to store the parameters in a generic format.

In an embodiment of the present disclosure, the access interface module further comprises a self-descriptive access layer.

In an embodiment of the present disclosure, the inferencing module is further configured to perform one or more of: (a) transforming the attributes into a format suitable for comparison with the historic attributes for the corresponding agro-climatic zone; (b) comparing the attributes with the historic attributes by referencing at least one rule reflecting a statistical classification scheme; (c) performing one of identifying a classification of the geographical region of interest or validating the classification of the geographical region of interest available in the knowledge base module by: generating a binary score for each of the parameters based on the referenced at least one rule for each time instance from the plurality of time instances to obtain a total score; generating a normalized net score based on the total score for the plurality of time instances and number of measurements pertaining to the received parameters; computing a compliance score for the geographical region of interest as a statistical average of the normalized net score generated for each sub-region of the geographical region of interest; and identifying a classification or classifying the geographical region of interest into one of the at least one agro-climatic zones based on the compliance score; (d) splitting the geographical region of interest into two or more sub-regions depending on the compliance score; and (e) splitting the agro-climatic zones into two or more sub-agro-climatic zones depending on the compliance score.

In an embodiment of the present disclosure, the knowledge base module is further configured to continually update itself with at least one of the identified classification and the validated classification of the geographical region of interest, parameters and attributes associated thereof.

In an embodiment of the present disclosure, the raw data comprises data in encoded form selected from the group consisting of semantic knowledge representation formats, ontologies, images and videos.

In an embodiment of the present disclosure, comparing the attributes with historic attributes is based on a predefined margin of error.

BRIEF DESCRIPTION OF THE DRAWINGS

The embodiments herein will be better understood from the following detailed description with reference to the drawings, in which.

Figure 1:
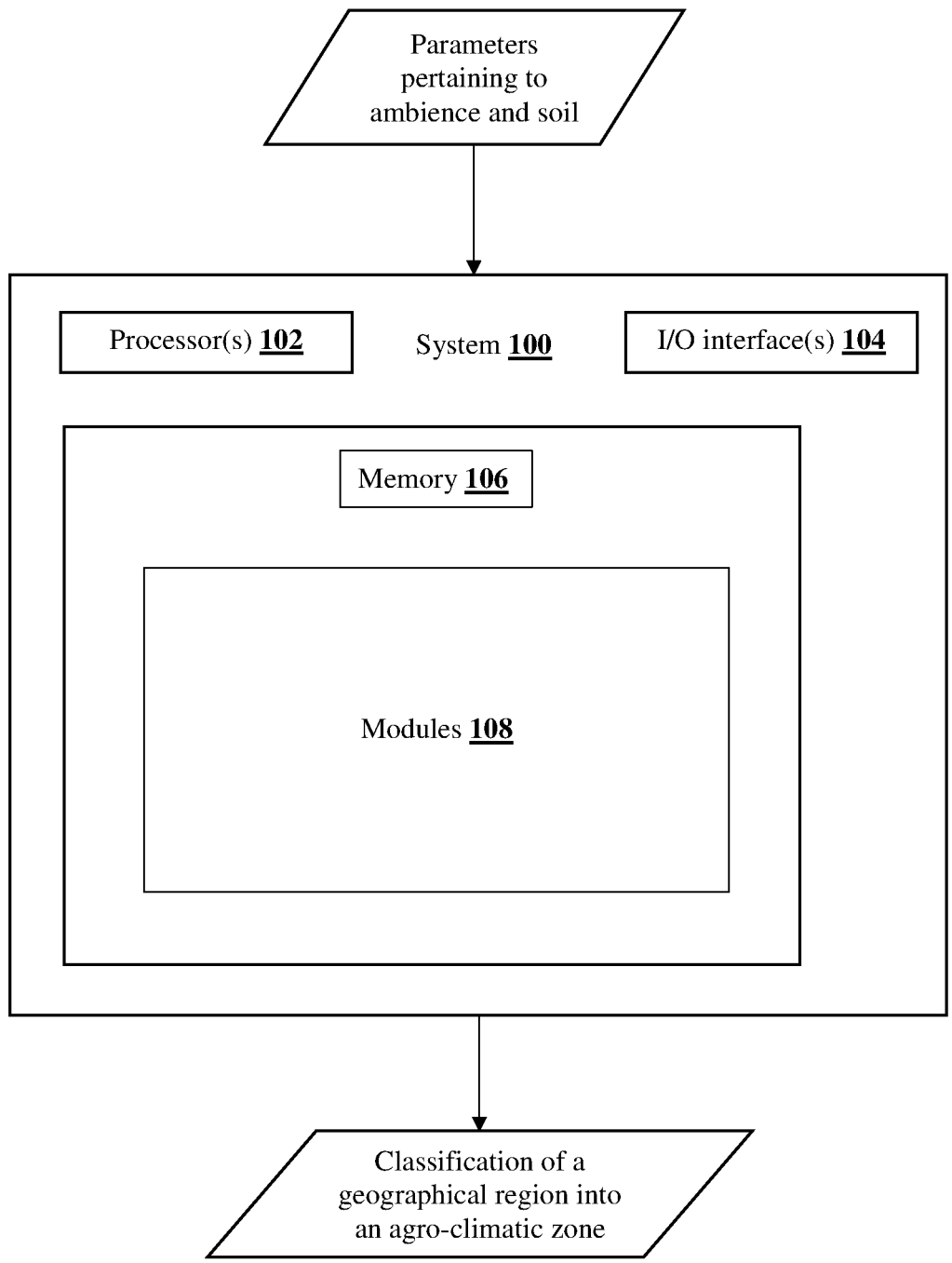
FIG. 1 illustrates an exemplary block diagram of a system for automated identification of agro-climatic zones in accordance with an embodiment of the present disclosure.

It should be appreciated by those skilled in the art that any block diagram herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computing device or processor, whether or not such computing device or processor is explicitly shown.

DETAILED DESCRIPTION

The embodiments herein and the various features and advantageous details thereof are explained more fully with reference to the non-limiting embodiments that are illustrated in the accompanying drawings and detailed in the following description. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present disclosure, the preferred, systems and methods are now described.

Some embodiments of this disclosure, illustrating all its features, will now be discussed in detail. The disclosed embodiments are merely exemplary of the disclosure, which may be embodied in various forms. Before setting forth the detailed explanation, it is noted that all of the discussion below, regardless of the particular implementation being described, is exemplary in nature, rather than limiting.

Development of relevant agro-climatic zones is closely dependent on accurate availability of ambient and soil parameters. This information has historically not been easily available due to the sheer number of sources, lack of appropriate technology and changing environmental conditions. Therefore a large number of agro-climatic zone configurations have been proposed by various authorized bodies. Again, size of these zones keeps reducing with time and new micro-zones are continuously being formed. There is a need to bring technological interventions that help in this process and provide smart insights from time-to-time on zone information w.r.t. the state of the art which can aid crop planning activities. This can help create real time agro-climatic zones that helps plan agricultural activities better on a smaller scale to improve crop-yield.

Systems and methods of the present disclosure provide a technological framework that can be used to conveniently and flexibly collect data from a plurality of external systems and derive attributes of parameters pertaining to ambience such as temperature, rainfall, and the like and soil characteristics such as type of soil, pH (potential of hydrogen) value, and the like, which are used to define and ascertain agro-climatic zones. The system of the present disclosure comprises a machine interpretable knowledge base module. The parameters obtained from the geographical region of interest are compared with parameters associated with pre-defined agro-climatic zones and the outcome is a score indicative of whether the geographical region of interest conforms to the characteristics of the agro-climatic zone defined for it. Such an inference can inform if there is a need to create further subdivisions in the form of agro-climatic subzones. The systems of the present disclosure may source information in real time from various sources and streams and combine this information with existing knowledge-bases to arrive at decisions that can be presented as services for consumption by external systems. Effectively, the proposed systems create a common configurable digital middle-ware fabric to connect all possible data sources, streams and sinks.

There is embodied intelligence in the systems of the present disclosure to enable inferences based on information received and processed; to generate and support smart inferences on agro-climatic zones, namely, to generate a score that represents the degree of conformance of a given zone to a pre-defined agro-climatic zone; to receive a geographical region of any size as input and compare it with a reference agro-climatic zone to identify potential deviations. To support the development of the intelligence on agro-climatic zones, data may be collected from a variety of modalities. This is captured through an access interface module and an external access module which have a collective capability to communicate flexibility with external sources for data gathering. The systems and methods of the present disclosure overcome limitations of conventional systems by (a) providing an automated and intelligent generic framework that remains adaptive to all kinds of interaction mechanisms with external sources (producers and consumers) of data, and (b) maintaining data in a generic format to comply with the different data structure requirements of the interacting systems. The systems and methods of the present disclosure are embodied with intelligence to infer encoded information such as from images, videos and ontologies, thereby enabling classification of a geographical region of interest even in the absence of relevant information.

Referring now to the drawings, and more particularly to FIGS. 1 through 6, where similar reference characters denote corresponding features consistently throughout the figures, there are shown preferred embodiments and these embodiments are described in the context of the following exemplary system and method.

Figure 2:
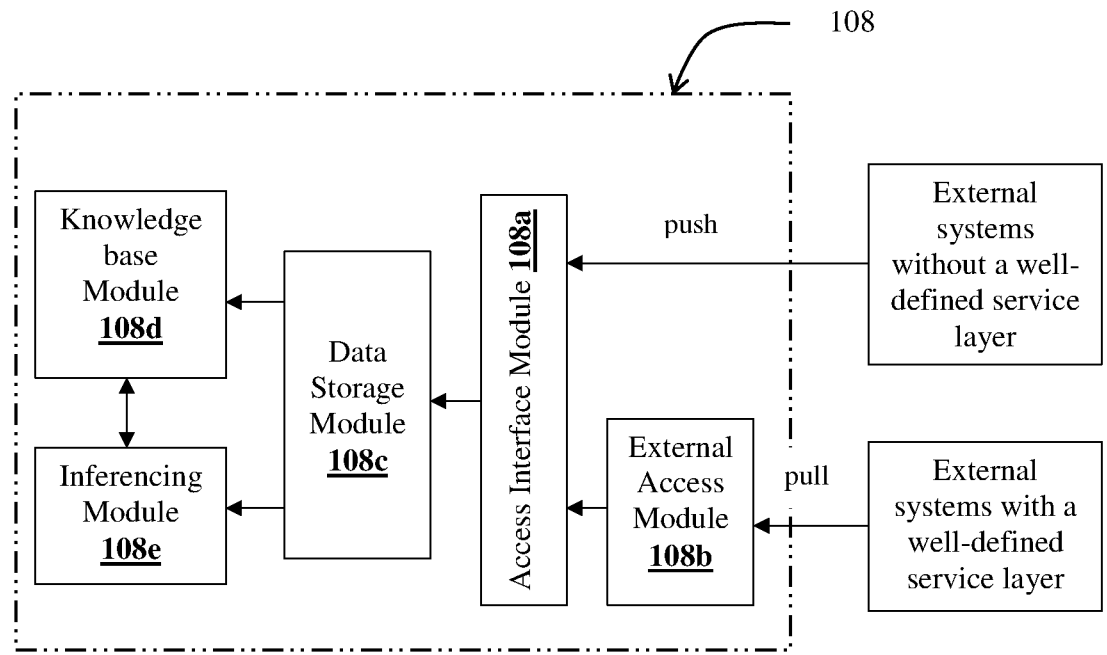
FIG. 2 illustrates an exemplary representation of functional modules comprising the system of FIG. 1 in accordance with an embodiment of the present disclosure.

FIG. 1 illustrates a block diagram of a system 100 for automated identification of agro-climatic zones and FIG. 2 is an exemplary representation of functional modules comprised in the system 100, in accordance with an embodiment of the present disclosure.

In an embodiment, the system 100 includes one or more processors 102, communication interface device(s) or input/output (I/O) interface(s) 104, and memory 106 or one or more data storage devices comprising one or more modules 108 operatively coupled to the one or more processors 102. The one or more processors are hardware processors that can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, the system 100 can be implemented in one or more computing systems, such as a laptop computer, a desktop computer, a notebook, a workstation, a mainframe computer, a server, a network server, cloud, hand-held device, wearable device and the like.

The I/O interface device(s) 104 can include a variety of software and hardware interfaces, for example, a web interface, a graphical user interface, IOT interface, and the like and can facilitate multiple communications within a wide variety of networks and protocol types, including wired networks, for example, LAN, cable, etc., and wireless networks, such as WLAN, cellular, or satellite. In an embodiment, the I/O interface device(s) 104 can include one or more ports for connecting a number of devices to one another or to another server.

The memory 106 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, various modules 108a through 108e (of FIG. 2) of the system 100 can be stored in the memory 106 as illustrated.

Figure 3:
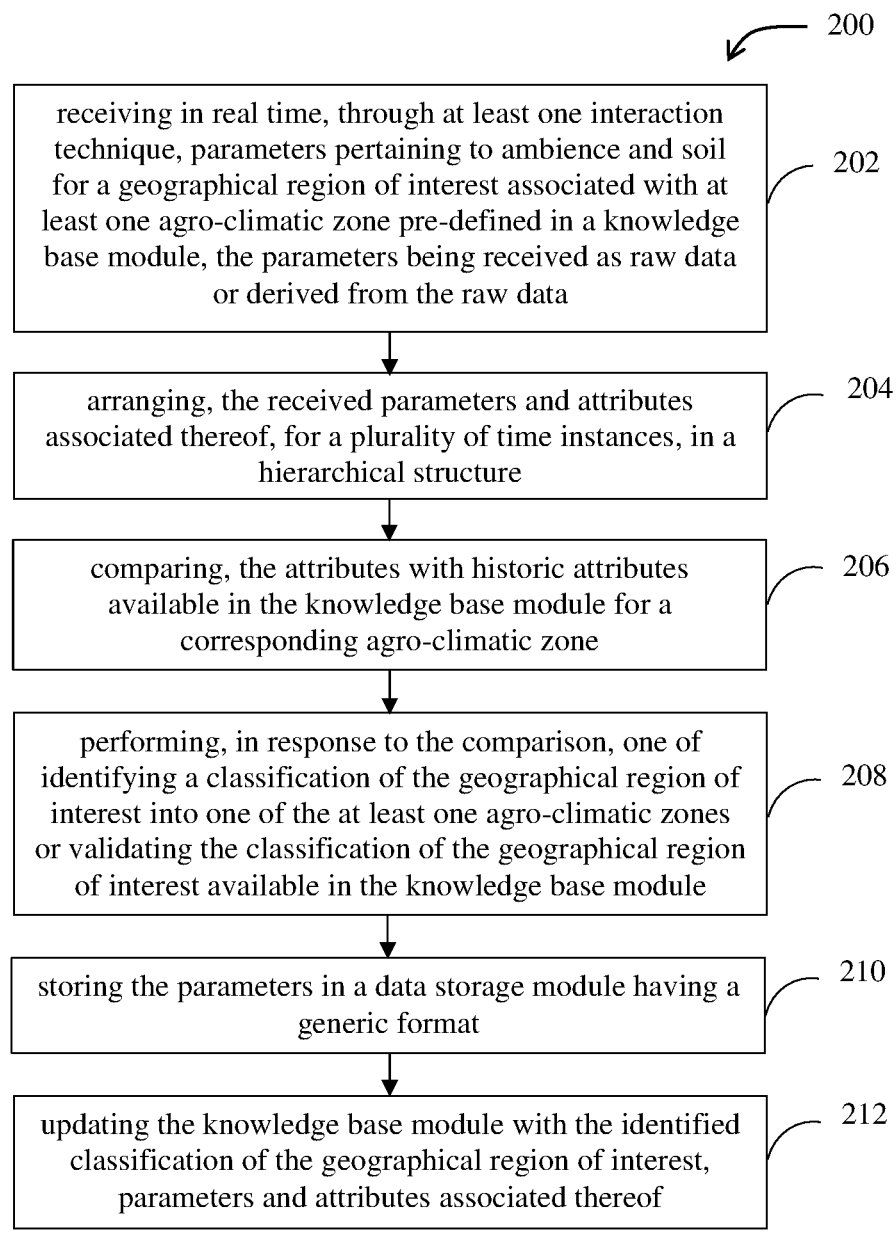
FIG. 3 is an exemplary flow diagram illustrating a computer implemented method for automated identification of agro-climatic zones using the system of FIG. 1 in accordance with an embodiment of the present disclosure.

FIG. 3 is an exemplary flow diagram illustrating a computer implemented method 200 for automated identification of agro-climatic zones, in accordance with an embodiment of the present disclosure. The steps of the computer implemented method 200 will now be explained with reference to the components of the system 100 as depicted in FIG. 1 and FIG. 2. In an embodiment, at step 202, parameters pertaining to soil and ambience from various external systems for a geographical region of interest are received via an access interface module 108a. The geographical region of interest may be associated with at least one agro-climatic zone pre-defined in a knowledge base module 108d. The knowledge base module 108d may include classifications of various geographical regions into one or more agro-climatic zones pre-defined by various authorized bodies defined in a machine interpretable format, for example, as numerical ranges or as description captured in the form of system parse-able knowledge-base such as ontologies. In an embodiment, the system 100 of the present disclosure may enable validating the classification of the geographical region of interest as belonging to a particular agro-climatic zone in the knowledge base module 108d. Alternatively, in an embodiment, the system 100 may facilitate identifying the agro-climatic zone associated with the geographical region of interest, if the same is not comprised in the knowledge base module 108d with pre-defined classification.

The parameters may be received from a variety of sources such as such as on-field sensors, drones, satellites, data-clouds, weather stations, rain gauges, devices as part of Internet of Things (IoT) ecosystems, and the like. Some of the sources may be external systems having a well-defined service layer such as data clouds and digital streams. Alternatively, some of the sources may be external systems not having a well-defined service layer such as data processing tools, sensor middleware systems and the like. In an embodiment, the parameters pertaining to ambience and soil may include micro-climatic parameters such as rainfall, temperature, humidity, altitude, soil type, and the like.

In accordance with the present disclosure, the parameters may be received in multiple heterogeneous formats at step 202 through at least one interaction method. Some parameters may be received as raw data having attributes in the form of plain values, double, string, sequence of values and the like. Alternatively, the parameters may be derived from the raw data received in encoded form such as ontological knowledge, binary large objects (BLOB) such as images and videos, and the like to make inferences on agro-climatic zone based score recommendations (discussed later in the description).

In an embodiment, the access interface module 108a provides an abstraction mechanism to allow the external systems to communicate with the system 100. In an embodiment, the abstraction mechanism is inclusive of interfaces such as Access Programming Interface (API) layer and query interfaces. The access interface module 108a may be configured to pull information from smart devices comprised in the external systems. Alternatively, passive external systems that do not have their own API layer may communicate with the system 100 by pushing information to the access interface module 108a. In an embodiment, the at least one interaction method maybe facilitated by a self-descriptive access layer. Accordingly, in accordance with the present disclosure, the access interface module 108a may expose to users, the capabilities and requirements for using the API effectively without a need for separate documentation. For instance, invoking some methods from the API may indicate to users that data from say maximum 12 sensors is acceptable at a time or that attributes of parameter "temperature" is to be provided in Celsius units, and the like.

In an embodiment, the system 100 provides an external access module 108b to enable pulling of parameters from external systems having a well-defined service layer. For instance, if there is a United States hosted satellite that monitors the geographical region of interest; the satellite may not actively attempt to communicate with the system 100. Accordingly, the system 100 needs to pull information in the form of say, a satellite image to derive some parameters, the external access module 108b may be configured to pull such satellite image. Thus the access interface module 108a is not only configured to receive information pushed by external systems (push interaction pattern) directly but is also configured to pull information from external systems having a well-defined service layer via the external access module 108b. In an embodiment, the access interface module 108a may also be configured to receive information in a publish-subscribe interaction pattern, wherein the system 100 may subscribe for certain published information.

Figure 5:
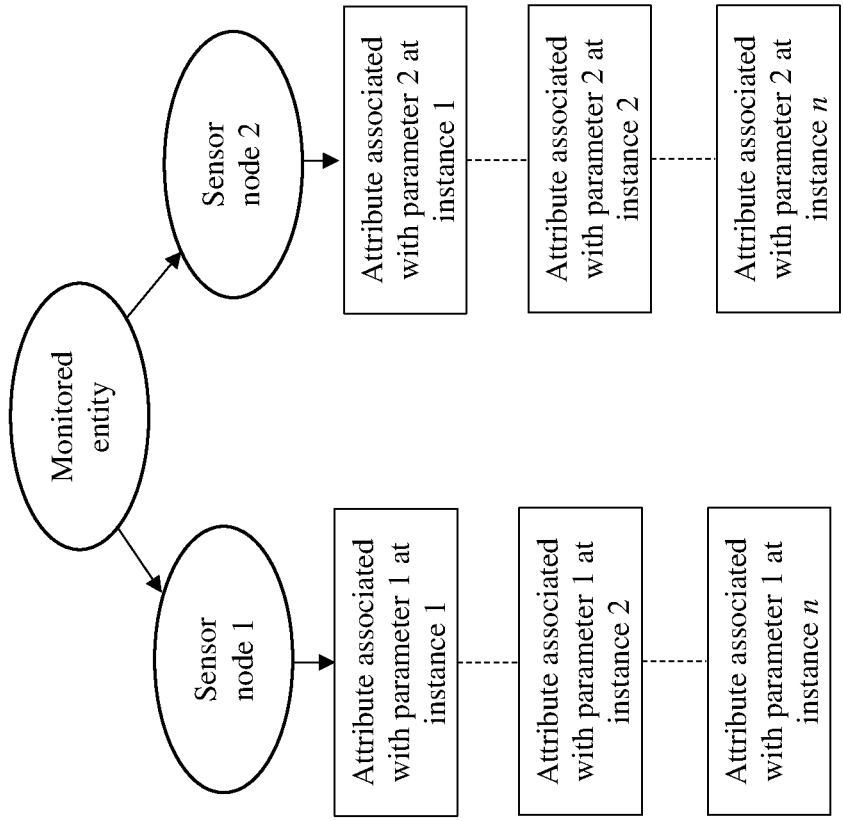
FIG. 5 illustrates an exemplary schematic representation of a hierarchical structure in which parameters and associated attributes are arranged, in accordance with an embodiment of the present disclosure.

In an embodiment, at step 204, an inferencing module 108e is configured to arrange the parameters received at step 202, for the plurality of time instances, in a hierarchical structure. FIG. 5 illustrates an exemplary schematic representation of a hierarchical structure in which parameters and associated attributes are arranged, in accordance with an embodiment of the present disclosure. A monitored entity at a first level may be the geographical region of interest having say two sensor nodes viz., sensor node 1 and sensor node 2 at a second level. The monitored parameters say parameter 1 and parameter 2 respectively may be at a third level along with the associated attributes. The attributes associated with each parameter may be received at a plurality of instances (n). In an embodiment, at step 210, the parameters and the associated attributes arranged in a hierarchical structure as illustrated in FIG. 5 may be stored in a data storage module 108c in a generic format. The generic and hierarchical format allows all types and categories of data to be mixed and facilitate conversion of this representation to other generic formats so that the raw data and processed data (computed score described later in the description) can be consumed conveniently by internal modules and external systems.

In an embodiment at step 206, the inferencing module 108e compares the attributes associated with the received parameters with historic attributes available in the knowledge base module 108d for a corresponding agro-climatic zone. In an embodiment, prior to the step of comparing, the inferencing module 108e may transform the attributes into a format suitable for comparison with the historic attributes to homogenize data received from one more or more heterogeneous external systems. For instance, attributes received may be a sequence of numeric values that need to be transformed to a set of individual numeric values for further computing of a compliance score. Attributes for some parameters may not be numeric. For instance, soil type may be a string value. Such attributes may need to be transformed to a numeric type. Some parameters such as soil type, again, may not be available as a string value but as an image or video, from a camera sensor enabled device, from which parameters are to be derived. For instance, a chemical test of soil sample may not be the only way to obtain soil type. An image of the soil obtained by an imaging system mounted on an aerial device such as a drone or a satellite may be used to estimate the soil type. In an embodiment, a library of soil images may be used to infer the parameter and the associated attribute. In an embodiment, the inferencing module 108e may be configured to derive parameters when the raw data is not restricted to the visible spectrum seen in RGB cameras but may use spectral components outside the visible spectrum as well. In an embodiment, spectral bands with different widths such as hyper spectral bands may be used for deriving parameters.

Figure 6:
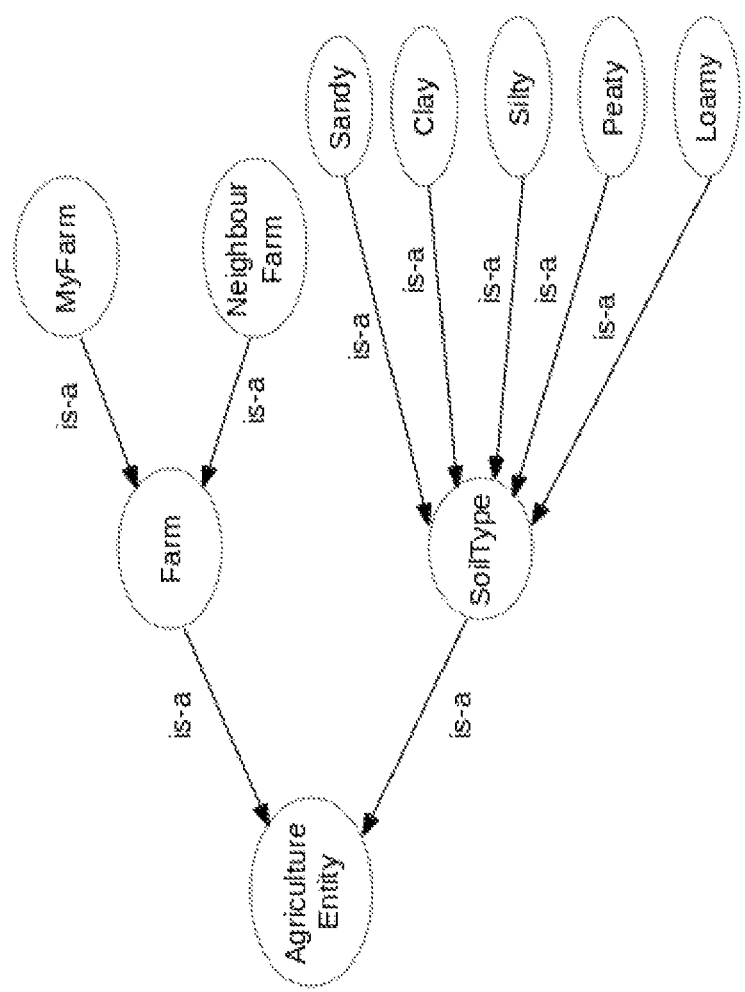
FIG. 6 illustrates an exemplary representation of ontological knowledge that may be parsed, in accordance with an embodiment of the present disclosure.

In an embodiment, the received parameters and the knowledge base module 108d may be encoded in semantic knowledge representation formats such as ontologies that need to be parsed to derive parameters and the associated attributes. This would particularly be useful in interpreting information where information may not be clearly available and may require reasoning over knowledge graphs to conclude on the parameters and the associated attributes. FIG. 6 illustrates an exemplary representation of ontological knowledge that may be parsed, in accordance with an embodiment of the present disclosure. As illustrated, say an ontology is available for an agriculture entity with sub-classes farm and attribute sub-classes for farm such as SoilType which takes one of the values {Clay, Loamy, Peaty, Sandy, Salty}. Such attributes and their values associated with each candidate farm may be reasoned over textually to arrive at required information. For example, a textual query—"Which farms have Clay soil?" translates to an ontological (semantic query) "Farm and (hasSoilType some Clay)" which returns two candidate farms "MyFarm" and "NeighbourFarm" based on attributes associated with the farms. In and embodiment, when some information pertaining to the farm required for computing the compliance score is missing, attributes associated with neighboring farms may be used along with a complex query (extending the example provided) to find the missing information, say, soil type. Once the missing information is obtained, the inferencing module 108e may transform the information to a numeric value for computing the compliance score.

Furthermore, the step of comparing the attributes with the historic attributes may comprise referencing at least one rule reflecting a statistical classification scheme. The knowledge base module 108*d* may comprise a set of rules that maybe used in computation of binary scores for each of the parameters as described herein below.

Figure 4:
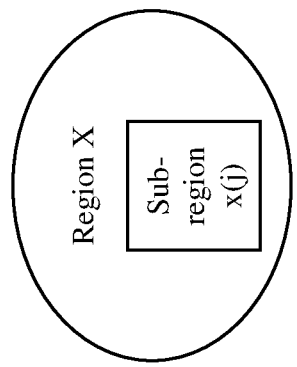
FIG. 4 is an exemplary schematic representation of a geographical region of interest X to be classified into an agro-climatic zone.

In an embodiment, in response to the comparison, the inferencing module 108*e* may at step 208, either identify a classification of the geographical region of interest into one of the agro-climatic zones or validate the classification of the geographical region of interest available in the knowledge base module 108*d*. In an embodiment, a compliance score may be computed as explained herein below wherein the various alphanumeric references include:

Z: agro-climatic zone
X: geographical region under consideration
$x(j)$: sub-region of region X where j=1, 2, 3, . . . K
$t(i)$: discrete time time-instance i, where i=0,1,2,3, . . . I
$p(m)$: parameter m in the set of parameters p={temp, hum, altitude, etc.} where m=0,1,2, . . . M
$p(m,i)$: measurement associated with the parameter $p(m)$ at time $t(i)$
$s(m,i)$: binary score associated with parameter $p(m)$ at time $t(i)$ provided a measurement for $p(m)$ exists at time instance $t(i)$
$N(m)$: number of measurements obtained for parameter $p(m)$
$S(x(j))$: score for sub-region $x(j)$
$S(X)$: score for region of interest X The exemplary computation described herein below aims to obtain a score that may be indicative of conformance of the geographical region of interest X to the agro-climatic zone Z. FIG. 4 is an exemplary schematic representation of a geographical region of interest X to be classified into an agro-climatic zone. With reference to FIG. 4, it may be assumed that sub-region $x(j)$ of X where parts of $x(j)$ are fully contained within X refers to an indivisible unit in the agro-climatic zone Z with respect to the parameters being observed i.e. variation in any parameter, for example, temperature, is the same for any point within $x(j)$. The access interface module 108*a* and the external access module 108*b* facilitate fetching of the parameters affecting the agro-climatic zone classification from one or more sources such as sensors, automatic weather stations or sensor data clouds. At any given instance of time $t(i)$ say for i=0, temperature (T), rainfall (R) and altitude (A) are the parameters under consideration and are all numerical values.

To classify the geographical region of interest, firstly the inferencing module 108*e* generates a binary score for each of the parameters based on the referenced at least one rule for each time instance. For instance, a rule for identifying a cool-type zone (Z) may require mean air temperature <10 deg. C., annual rainfall <100 cm and an altitude ≥2000 m. The received parameters temperature (T), rainfall (R) and attitude (A) may be compared with this rule to obtain a binary score of 0 or 1 for each of the received parameters at the time instant $t(0)$.

For any sub-region $x(j)$, let $p(0), p(1), p(2), \ldots p(m)$ denote parameters temperature, altitude, rainfall and the like. The binary score is computed all time instances to obtain a total score for all the observations. A normalized net score is generated based on the total score for the plurality of time instances and number of measurements pertaining to the received parameters. Accordingly, the normalized net score for $x(j)$ may be given as $S(x(j))=\text{sum}(s(m,i))/\text{sum}(N(m))$ for all m, i. The inferencing module 108*e* then computes a compliance score for the geographical region of interest as a statistical average (such as mean, mode, median or range) of the normalized net score $S(x(j))$ generated for each sub-region $x(j)$ of X. Accordingly, for K sub-regions, the compliance score for X may be given as $S(X)=\text{sum}(S(x(j))/K$. The inferencing module 108*e* then identifies a classification or validates the classification of the geographical region of interest into one of the at least one agro-climatic zones based on the compliance score. A value of 1 indicates full compliance whereas that of 0 indicates no compliance. On similar lines, all micro-climatic parameter values from atmospheric to vegetation and soil characteristics for the geographical region X may be considered for calculation of the compliance score.

In an embodiment, a pre-defined margin of error e may be assumed for certain parameters associated with floating point values for the associated attributes to enable making a decision based on comparison with attributes available in the knowledge base module. The margin of error may be used to establish equality for a given parameter. For instance, in case of the parameter "temperature", a received temperature may be considered 30 deg. C. provided 30−e<received temperature<30+e. In another embodiment, the margin of error e may be used as a threshold for range based statistical measures such as standard deviation from a mean value, mean absolute error, root mean squared error and likewise with a temporal parameter sequence $p(m,i), \ldots p(m,i+I-1)$ for a parameter $p(m)$ for a length l where I≥1 while comparing for equivalence with the parameter values in the knowledge base module. Accordingly, if say temperature is measured as 30.1 deg. C. and compliance for a zone necessitates temperature to be 30 deg. C., in accordance with the present disclosure, an error margin e would define a permissible variation in the attribute of the received parameter to conclude on compliance. Again when the attribute for a parameter is a range of values, the error margin e would define a permissible variation in one of the statistical measures adopted. In lieu of margin of error, similar metrics such as coefficients of correlation or regression may be used for comparing the parameter measurements against the knowledge base module to compute a compliance score. In an embodiment, one or more parameter measurements may be used in combination to predict measurements for unknown parameters using machine learning and margin of error is applied, as applicable to compute a compliance score.

Depending on the compliance score, the inferencing module may split the geographical region of interest into two or more sub-regions. Alternatively, the agro-climatic zone may be split into two or more sub-agro-climatic zones.

In an embodiment, at step 212, the knowledge base module 108*d* may be updated with at least one of the identified classification and the validated classification of the geographical region of interest, parameters and the associated attributes. In an embodiment, the external access module 108*b* may be configured to disseminate to the external sources, information pertaining to tasking operations based on the updated knowledge base module 108*d*. For instance, farmers may be intimated regarding crops that are viable for a particular geographical region based on the identified classification.

In accordance with the present disclosure, one or more instances of the system 100 may be deployed as a multi-level connected system. For example, in an agricultural solution, one instance may be at a central location in communication with another instance of the component at the farm level that manages a local sensor network deployed on the farm. The functions of the inferencing module 108*e* may be executed at any level in such a multi-level connected system. In an embodiment, when provisioning the system 100 as a multi-level connected system, the inference module 108e, the access interface module 108a and the external access module 108b may have additional data processing capabilities such as de-noising, de-duplication, aggregation, averaging and other such derived inferences before sending the data to a next layer.

In accordance with an embodiment, the system 100 may have a distributed architecture, communicating with at least some heterogeneous external systems sharing parameters pertaining to ambience and soil for a geographical region of interest. The system may comprise one or more data storage devices (106) operatively coupled to one or more hardware processors (102) and configured to store instructions configured for execution by the one or more hardware processors to: receive in real time the parameters pertaining to the ambience and soil for the geographical region of interest associated with at least one agro-climatic zone pre-defined in a knowledge base module, the parameters being received as raw data or derived from the raw data through at least one interaction technique; arrange the received parameters and attributes associated thereof, for a plurality of time instances, in a hierarchical structure; compare the attributes with historic attributes available in the knowledge base module for a corresponding agro-climatic zone; and perform in response to the comparison, one of identifying a classification of the geographical region of interest into one of the at least one agro-climatic zones or validating the classification of the geographical region of interest available in the knowledge base module.

All parts or protocols of the embodiments associated with the present disclosure are platform independent, and therefore inclusive of any underlying technology used to implement them. For instance, the data storage module 108c may be implemented in SQL/No-SQL/flat files or combination of such systems e.g. MySQL™, Postgres™, MongoDB™, Hadoop™. The access interface module 108a and the external access module 108b and any underlying streams may be implemented on any underlying physical/carrier protocol such as TCP-IP or any other custom-defined protocol. The data formats used for communication both internally and externally may occur in any format—JSON/XML etc.

The written description describes the subject matter herein to enable any person skilled in the art to make and use the embodiments of the invention. The scope of the subject matter embodiments defined here may include other modifications that occur to those skilled in the art. Such other modifications are intended to be within the scope if they have similar elements that do not differ from the literal language of the claims or if they include equivalent elements with insubstantial differences from the literal language.

It is, however to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the invention may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules comprising the system of the present disclosure and described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device. The various modules described herein may be implemented as either software and/or hardware modules and may be stored in any type of non-transitory computer readable medium or other storage device. Some non-limiting examples of non-transitory computer-readable media include CDs, DVDs, BLU-RAY, flash memory, and hard disk drives.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Further, although process steps, method steps, techniques or the like may be described in a sequential order, such processes, methods and techniques may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

The preceding description has been presented with reference to various embodiments. Persons having ordinary skill in the art and technology to which this application pertains will appreciate that alterations and changes in the described structures and methods of operation can be practiced without meaningfully departing from the principle, spirit and scope.

We claim:

1. A processor implemented method comprising:
receiving in real time, via an access interface module, through at least one interaction method from external systems, parameters pertaining to ambience and soil for a geographical region of interest associated with at least one agro-climatic zone pre-defined in a knowledge base module, the parameters being derived from raw data received from the external system, wherein the raw data comprises data in encoded form selected from a group consisting of semantic knowledge representation formats, ontologies, images and videos, wherein the parameters are derived from the raw data by reasoning over knowledge graphs, wherein the at least one interaction method comprises one of receiving information pushed by the external systems without a well-defined service layer or pulling information from the external systems having the well-defined service layer, and wherein the at least one interaction method is facilitated by a self-descriptive access layer which exposes capabilities and requirements for using an Access Programming Interface of the access interface module to a user;

arranging, by an inferencing module, the received parameters and attributes associated thereof, for a plurality of time instances, in a hierarchical structure;

comparing, by the inferencing module, the attributes with historic attributes available in the knowledge base module for a corresponding agro-climatic zone, wherein the step of comparing the attributes with the historic attributes is preceded by transforming the attributes present in form of a string value or image or video into a set of numerical values for comparison with the historic attributes for the corresponding agro-climatic zone, wherein the attributes are transformed into the set of numerical values to homogenize data received from heterogeneous external systems; and performing, by the inferencing module, in response to the comparison, one of identifying a classification of the geographical region of interest into at least one new agro-climatic zone or validating the classification of the geographical region of interest available in the knowledge base module by:

generating a binary score for each of the parameters based on at least one rule reflecting a statistical classification scheme for each time instance from the plurality of time instances to obtain a total score;

generating a normalized net score based on the total score for the plurality of time instances and number of measurements pertaining to the received parameters;

computing a compliance score for the geographical region of interest as a statistical average of the normalized net score generated for each sub-region of the geographical region of interest;

identifying a classification of the geographical region of interest into one of the at least one new agro-climatic zone or validating the classification of the geographical region of interest available in the knowledge base module, based on the compliance score;

splitting the geographical region of interest into two or more sub-regions depending on the compliance score; and splitting the new agro-climatic zones into two or more sub-agro-climatic zones depending on the compliance score.

2. The processor implemented method of claim 1 further comprising storing the parameters, arranged in the hierarchical structure, in a data storage module, in a generic format.

3. The processor implemented method of claim 1 further comprising updating the knowledge base module with at least one of the identified classification and the validated classification of the geographical region of interest, said parameters and said attributes associated thereof.

4. The processor implemented method of claim 1, wherein comparing the attributes with historic attributes is based on a pre-defined margin of error.

5. A system comprising:
one or more processors; and
one or more internal data storage devices operatively coupled to the one or more processors for storing instructions configured for execution by the one or more processors, the instructions being comprised in:
a knowledge base module comprising geographical regions mapped to at least one agro-climatic zone, parameters and attributes associated thereof for the geographical regions;

an access interface module configured to receive in real time, through at least one interaction technique from external systems, parameters pertaining to ambience and soil for a geographical region of interest associated with the at least one agro-climatic zone, the parameters being derived from the raw data received from the external system, wherein the raw data comprises data in encoded form selected from a group consisting of semantic knowledge representation formats, ontologies, images and videos, wherein the parameters are derived from the raw data by reasoning over knowledge graphs, wherein the at least one interaction method comprises one of receiving information pushed by the external systems without a well-defined service layer or pulling information from the external systems having the well-defined service layer, and wherein the at least one interaction method is facilitated by a self-descriptive access layer which exposes capabilities and requirements for using an Access Programming Interface API of the access interface module to a user; and an inferencing module configured to:
arrange the received parameters and attributes associated thereof, for a plurality of time instances, in a hierarchical structure;

compare the attributes with historic attributes available in the knowledge base module for a corresponding agro-climatic zone, wherein the attributes are compared with the historic attributes is preceded by transforming the attributes present in form of a string value or image or video into a set numerical values for comparison with the historic attributes for the corresponding agro-climatic zone, wherein the attributes are transformed into the set of numerical values to homogenize data received from heterogeneous external systems; and perform in response to the comparison, one of identifying a classification of the geographical region of interest into one of the at least one new agro-climatic zone or validating the classification of the geographical region of interest available in the knowledge base module by:

generating a binary score for each of the parameters based on at least one rule reflecting a statistical classification scheme for each time instance from the plurality of time instances to obtain a total score;

generating a normalized net score based on the total score for the plurality of time instances and number of measurements pertaining to the received parameters;

computing a compliance score for the geographical region of interest as a statistical average of the normalized net score generated for each sub-region of the geographical region of interest;

identifying said classification of the geographical region of interest into one of the at least one new agro-climatic zone or validating the classification of the geographical region of interest available in the knowledge base module, based on the compliance score;

splitting the geographical region of interest into two or more sub-regions depending on the compliance score; and splitting the new agro-climatic zones into two or more sub-agro-climatic zones depending on the compliance score.

6. The system of claim 5, wherein the instructions are further comprised in a data storage module configured to store the parameters in a generic format.

7. The system of claim 5, wherein the knowledge base module is further configured to continually update itself with the at least one of the identified classification and the validated classification of the geographical region of interest, said parameters and said attributes associated thereof.

8. A system having a distributed architecture, communicating with at least some heterogeneous external systems sharing parameters pertaining to ambience and soil for a geographical region of interest, the system comprising:
one or more data storage devices operatively coupled to one or more hardware processors and configured to store instructions configured for execution by the one or more hardware processors to:
receive in real time, through at least one interaction technique from external systems, the parameters pertaining to the ambience and said soil for the geographical region of interest associated with at least one agro-climatic zone pre-defined in a knowledge base module, the parameters being derived from raw data received from the external system, wherein the raw data comprises data in encoded form selected from a group consisting of semantic knowledge representation formats, ontologies, images and videos, wherein the parameters are derived from the raw data by reasoning over knowledge graphs, wherein the at least one interaction method comprises one of receiving information pushed by the external systems without a well-defined service layer or pulling information from the external systems having the well-defined service layer, and wherein the at least one interaction method is facilitated by a self-descriptive access layer which exposes capabilities and requirements for using an Access Programming Interface API of the access interface module to a user;
arrange the received parameters and attributes associated thereof, for a plurality of time instances, in a hierarchical structure;
compare the attributes with historic attributes available in the knowledge base module for a corresponding agro-climatic zone, wherein the attributes are compared with the historic attributes is preceded by transforming the attributes present in form of a string value or image or video into a set of numerical values for comparison with the historic attributes for the corresponding agro-climatic zone, wherein the attributes are transformed into the set of numerical values to homogenize data received from heterogeneous external systems; and
perform in response to the comparison, one of identifying a classification of the geographical region of interest into at least one new agro-climatic zone or validating the classification of the geographical region of interest available in the knowledge base module by:
generating a binary score for each of the parameters based on at least one rule reflecting a statistical classification scheme for each time instance from the plurality of time instances to obtain a total score;
generating a normalized net score based on the total score for the plurality of time instances and number of measurements pertaining to the received parameters;
computing a compliance score for the geographical region of interest as a statistical average of the normalized net score generated for each sub-region of the geographical region of interest;
identifying a classification of the geographical region of interest into one of the at least new one agro-climatic zone or validating the classification of the geographical region of interest available in the knowledge base module, based on the compliance score;
splitting the geographical region of interest into two or more sub-regions depending on the compliance score; and
splitting the new agro-climatic zones into two or more sub-agro-climatic zones depending on the compliance score.

* * * * *